United States Patent
Spurr et al.

(10) Patent No.: US 6,735,822 B2
(45) Date of Patent: May 18, 2004

(54) VEHICLE HINGE AND LATCHING ARRANGEMENT ADJUSTMENT

(75) Inventors: Nigel Victor Spurr, Solihull (GB); Sidney Fisher, Solihull (GB); Simon Dobson, Sandgate (GB)

(73) Assignee: Meritor Light Vehicle Systems (FR)

( * ) Notice: Subject to any disclaimer, the term of this patent is extended or adjusted under 35 U.S.C. 154(b) by 0 days.

(21) Appl. No.: 10/138,001

(22) Filed: May 3, 2002

(65) Prior Publication Data
US 2002/0166206 A1 Nov. 14, 2002

(30) Foreign Application Priority Data
May 5, 2001 (GB) .............................................. 0111121

(51) Int. Cl.$^7$ .......................... E05D 11/10; E05D 11/00
(52) U.S. Cl. .............................. 16/319; 16/374; 16/388; 292/DIG. 17; 292/210; 296/146.11
(58) Field of Search .......................... 16/231, 223, 222, 16/365, 374, 382, 388, 347, 349, 387, 319; 296/188, 189, 146.6, 146.5, 146.11, 146.12; 70/105, 106, 136, 137; 292/210, 253, 136, 346, 337, DIG. 17, DIG. 23, DIG. 41, DIG. 65; 180/274, 281

(56) References Cited

U.S. PATENT DOCUMENTS

| | | | |
|---|---|---|---|
| 3,680,902 A * | 8/1972 | Slattery ................. | 292/341.14 |
| 4,293,160 A | 10/1981 | Luetze et al. | |
| 4,670,941 A * | 6/1987 | Peterson ....................... | 16/332 |
| 4,702,040 A | 10/1987 | Hellriegel | |
| 4,719,665 A * | 1/1988 | Bell ............................ | 16/232 |
| 4,756,565 A | 7/1988 | Myslicki et al. | |
| 4,998,759 A | 3/1991 | Peterson et al. | |
| 5,524,324 A | 6/1996 | Kunkel | |
| 5,553,351 A * | 9/1996 | Starks .......................... | 16/223 |
| 5,624,150 A * | 4/1997 | Venier ................... | 296/146.11 |
| 5,675,869 A | 10/1997 | Lotz | |
| 6,073,980 A * | 6/2000 | Arabia et al. ................ | 292/340 |
| 6,151,757 A * | 11/2000 | Beals et al. .................... | 16/380 |
| 6,247,744 B1 * | 6/2001 | Townsend et al. ...... | 296/146.11 |
| 6,312,045 B2 * | 11/2001 | Kitagawa ..................... | 296/188 |
| 6,428,063 B1 * | 8/2002 | Bland .......................... | 292/346 |

FOREIGN PATENT DOCUMENTS

| | | |
|---|---|---|
| DE | 30 24 230 | 1/1982 |
| DE | 4118573 A1 * | 12/1992 |
| DE | 19522 220 | 1/1997 |
| DE | 199 42 107 | 5/2000 |
| DE | 10030167 A1 * | 1/2002 |
| FR | 2 506 687 | 12/1982 |
| FR | 2 609 493 | 7/1988 |
| FR | 2 772 334 | 6/1999 |
| GB | 2105776 A * | 3/1983 |
| JP | 10-212846 | 1/1997 |
| JP | 11-1124 * | 1/1999 |
| WO | WO 00/21767 | 4/2000 |

* cited by examiner

Primary Examiner—Chuck Y. Mah
(74) Attorney, Agent, or Firm—Carson, Gaskey & Olds

(57) ABSTRACT

A hinge for pivotally mounting a first door to a door pillar of a vehicle body of a vehicle. The hinge having been provided thereon one portion of a co-operating latching arrangement for releasably securing in a closed position a second door.

11 Claims, 3 Drawing Sheets

VEHICLE HINGE AND LATCHING ARRANGEMENT ADJUSTMENT

This application claims priority to United Kingdom application Number GB 0111121.1 filed on May 5, 2001.

BACKGROUND OF THE INVENTION

The present invention relates to a vehicle, a hinge and a method of adjusting a latching arrangement. More specifically, the present invention relates to a hinge for pivotally mounting a door to a door pillar of a vehicle body, and a vehicle incorporating such a hinge.

Vehicle passenger doors are currently provided with a latch situated midway up the rear side of the door. When the door is closed, the latch engages with a striker positioned on a door pillar such that the door is fixed in a closed position, until the latch is released from the striker when the door handle is operated.

Cars are specifically designed with front and rear crumple zones to absorb a substantial amount of impact to the car body. Additionally, side intrusion beams are generally provided in the void between the inner and outer skins of car passenger doors to assist in the protection of the passengers (which term is understood to include the driver) from side impact due to a collision with another vehicle, for example. Normally, such beams operate by transmitting the force of the impact via the door hinges and latch to the door pillars and then to the roof and sill of the vehicle where the force is dissipated.

The doors together with such door pillars form a rigid safety cell to protect the occupants of the vehicle passenger compartment. However the strength of the safety cell is very much dependent on the doors remaining in a closed position when an impact occurs either to the side or to either end of the car such that the force transmission path operates as intended.

To improve the structural integrity of such force transmission paths it is desirable to minimize the number of components through which impact forces must pass as the potential for weak points in the path is thus minimized. Furthermore, it is desirable to minimize any offsets in the force transmission paths that in effect, would cause axial forces to induce bending moments in the vehicle doors, for example, that would increase the risk of a component failure causing a door to open. In prior art vehicles, the intrusion beams generally run proximate the outboard face of a car door whereas the latch is positioned proximate the inboard face of the door, resulting in an offset. Additionally, in prior art vehicles the striker arranged to cooperate with the latch for the front door is secured separately from the rear door hinge to the B pillar of the vehicle. The B pillar is generally manufactured from relatively thin sheet metal and may thus be considered to be a weak point susceptible to failure by tearing under load. The positioning of the striker directly on the B pillar also means that the striker may only be accessed to enable adjustment of its position when the front door is opened.

SUMMARY OF THE INVENTION

The present invention seeks to overcome, or at least mitigate, the problems with the prior art.

One aspect of the present invention provides a hinge for pivotally mounting a first door to a door pillar of a vehicle body of a vehicle, the hinge having been provided thereon one portion of a co-operating latching arrangement for releasably securing in a closed position a second door.

One advantage of this aspect of the invention is that the risk of a portion of the latching arrangement being torn from the B pillar is minimized.

A second aspect of the present invention provides a vehicle having a vehicle body and a door releasably securable in a closed position relative to the vehicle body by means of a latching arrangement comprising a latch and striker, one of the latch or striker being mounted on a pillar of the vehicle body and the other being mounted on the door, wherein the latch or striker is positioned proximate the outboard face of the vehicle body.

One advantage of this aspect of the invention is that the offset between the latching arrangement and a side intrusion beam is minimized.

A third aspect of the present invention provides a portion of a co-operating latching arrangement for releasably securing a first door to a fixed structure of a vehicle body of a vehicle, the portion comprising means for adjusting the position of the portion relative to the fixed structure wherein the adjusting means is accessible to enable adjustment when the first door is closed.

A fourth aspect of the present invention provides a method of adjusting a portion of a co-operating latching arrangement for releasably securing a first door to a fixed structure of a vehicle body of a vehicle, wherein means is provided to adjust the position of the portion relative to the first door, the method comprising the steps of: closing the first door so as to be releasably secured by the latching arrangement and adjusting the position of the portion.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENT

Figure 1:
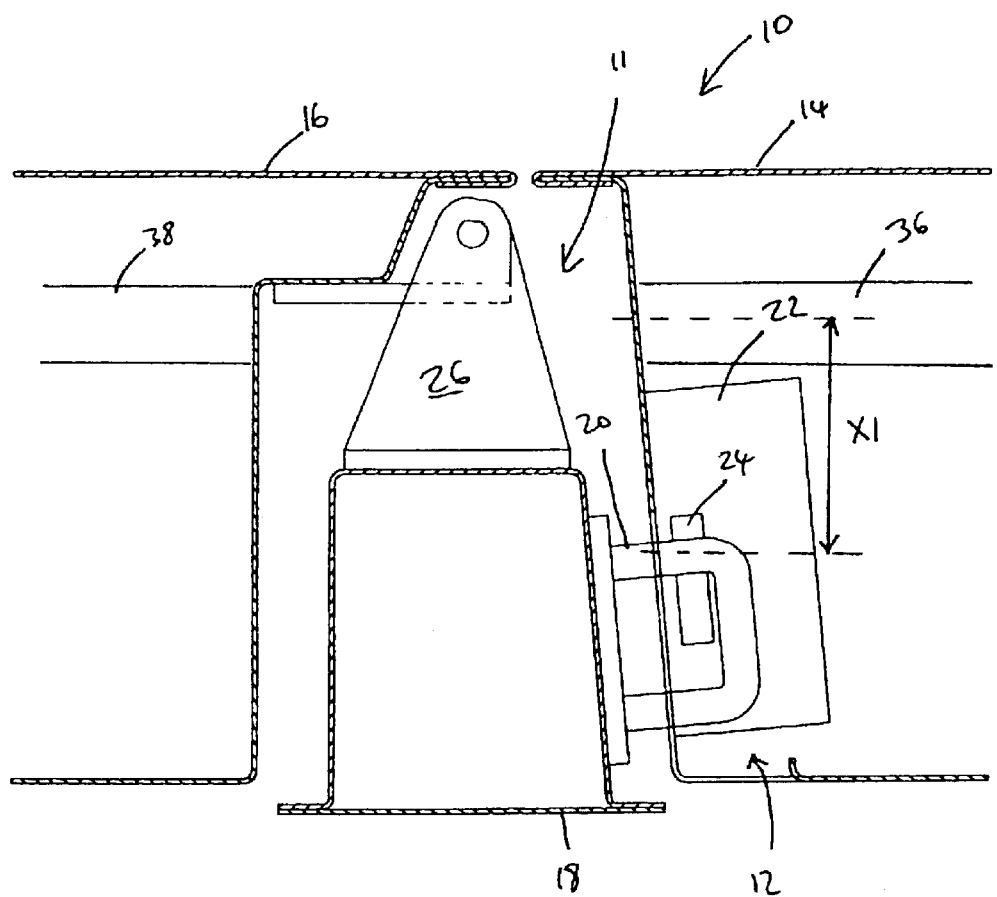
FIG. 1 is a cross-sectional view along a substantially horizontal plane through a prior art vehicle door and pillar arrangement.

Referring to FIG. 1, there is shown a cross-sectional view through a prior art door arrangement 10 comprising a front passenger door 14, a rear passenger door 16, and a door pillar (B pillar) 18. A latching arrangement 12 is provided to releasably secure the front door in a closed position relative to the B pillar 18, the door being pivotable at a hinge (not shown) provided on the front face of the door to enable the door to move between an open and closed position. A further hinge 11 is further mounted on the B pillar 18 to enable the rear passenger door 16 to open pivotally. A further latching arrangement (not shown) releasably secures the rear door to a C pillar of the vehicle.

Schematically illustrated side intrusion door beams 36 and 38 extend substantially horizontally from the front to the rear ends of the front and rear passenger doors 14 and 16 and, as can be seen from FIG. 1, are positioned proximate the outboard face of the doors and are extended substantially parallel to the longitudinal axis of the doors.

In the event of a side impact on front door 14, the force of the impact acting in an inboard direction in turn causes a longitudinal force to act along the axis of beam 36. As the axis of beam 36 is offset in a transverse direction from the point of securement between striker 20 and claw 24 by a distance X1, a bending moment is induced that would tend to promote the tearing of striker 20 from the B pillar 18, thus potentially causing the door to open inwardly and prevent the impact force from being transmitted to the B pillar. In frontal or rear impacts that result in transmission of force through the doors similar bending moments may be induced that would also result in the failure of the latching arrangement.

It should also be noted that in prior art door arrangements, the positioning of the striker 20 means that the door 14 must be open for adjustment to the striker position to be achieved when aligning the striker with the claw potentially causing this to be a somewhat laborious process.

Figure 2:
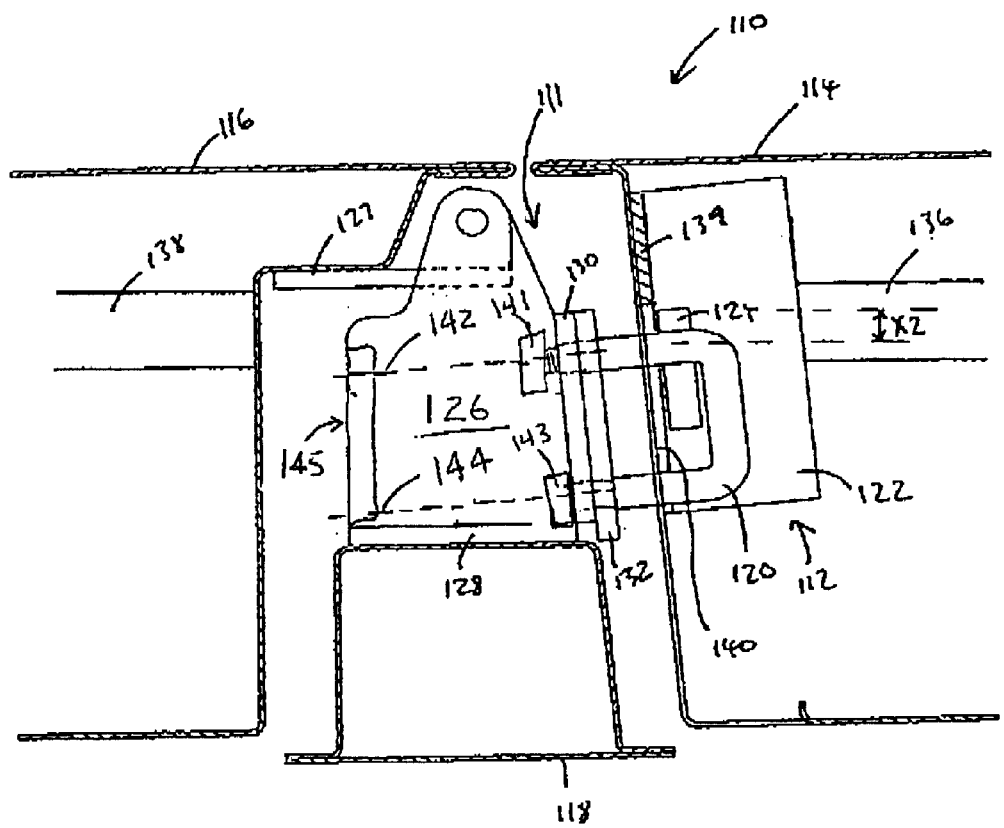
FIG. 2 is a cross-sectional view through a door and pillar arrangement incorporating a hinge and latching arrangement according to one embodiment of the present invention.

Turning now to FIG. 2 which illustrates a vehicle door arrangement incorporating a hinge according to one embodiment of the invention and in which like parts have where possible been designated by like numerals with the addition of the prefix '1'. Thus, only those parts that differ from FIG. 1 are discussed in greater detail below.

It is apparent that, in this embodiment, the transverse dimension of the B pillar 118 has being reduced in the location of the latch in comparison with B pillar 18 of the prior art. Thus, to ensure that the pivoting axis of the rear door is maintained in the same transverse position relative to the rear door, the transverse dimension of the pillar mounting member 126 of the hinge 111 is, in turn, increased.

To enable the transverse position of the pivoting axis to be adjusted, a removable shim 128 is preferably provided intermediate the member 126 of the hinge at the B pillar 118. The hinge may be mounted to the B pillar using screws, rivets or any other suitable means known in the art.

By increasing the transverse dimension of the hinge member 126, sufficient area is provided on the member to mount a hoop-type striker 120 thereon, the striker 120 acting as one portion of a co-operating latching arrangement 112. In one class of the embodiments, the striker may be mounted on the member 126 using screws screwed into the member 126 along axes 142 and 144 from the front face of a striker backing plate 132. However, in a preferred embodiment, screws 141,143 may be used to secure the striker 120 by being screwed from the rear face of the member 126 through the mounting member and into the rear of backing plate 132. This arrangement when provided in combination with captive adjusting means such as vertical and horizontal adjustment screws enables the position of the striker 120 to be adjusted in two degrees of freedom whilst the front door is closed, but the rear door 116 is in an open position, thus revealing the rear of the mounting member 126. An opening 145 allows access to the screws 141, 143 securing the striker 120. A removable shim 130 may be provided to enable adjustment of the striker fore and aft. In two door cars, a trim panel behind the B pillar may, for example, be provided to gain access to enable the striker position to be adjusted with the front door closed.

In this embodiment, the other portion of the latch arrangement 112 is provided by latch 122 mounted on the rear face of the front door 114, again using screws or other means known in the art. The latch preferably is of a type having a claw 124 that co-operates with a strengthened retention plate 139 having a mouth 140 provided therein to releasably engage and capture the striker 120.

It is also apparent from FIG. 2 that the offset X2 between the axis of intrusion beam 136 of the front door beam and the point of securement of the striker is greatly reduced. Indeed, in a preferred class of embodiments the point of securement between the latch and striker is arranged co-axially with the beam when the door is in a closed position. Therefore, little or no bending moment is induced if an impact occurs. In turn, this reduces the risk of the front door being caused to open by the detachment of the striker from the pillar.

Furthermore, by securing the striker to the mounting member 126, the structural integrity of the door to B pillar to door connection may be improved independently of any reduction in bending moments because member 126 is manufactured from stronger materials than the B pillar. In the event of a side impact, the reduced number of components between the striker and the second hinge mounting member 127 means that the weakest part of the prior art force path, the connection between B pillar 118 and striker 120, is removed increasing the overall structural integrity of the whole side of the passenger cell.

Figure 3:
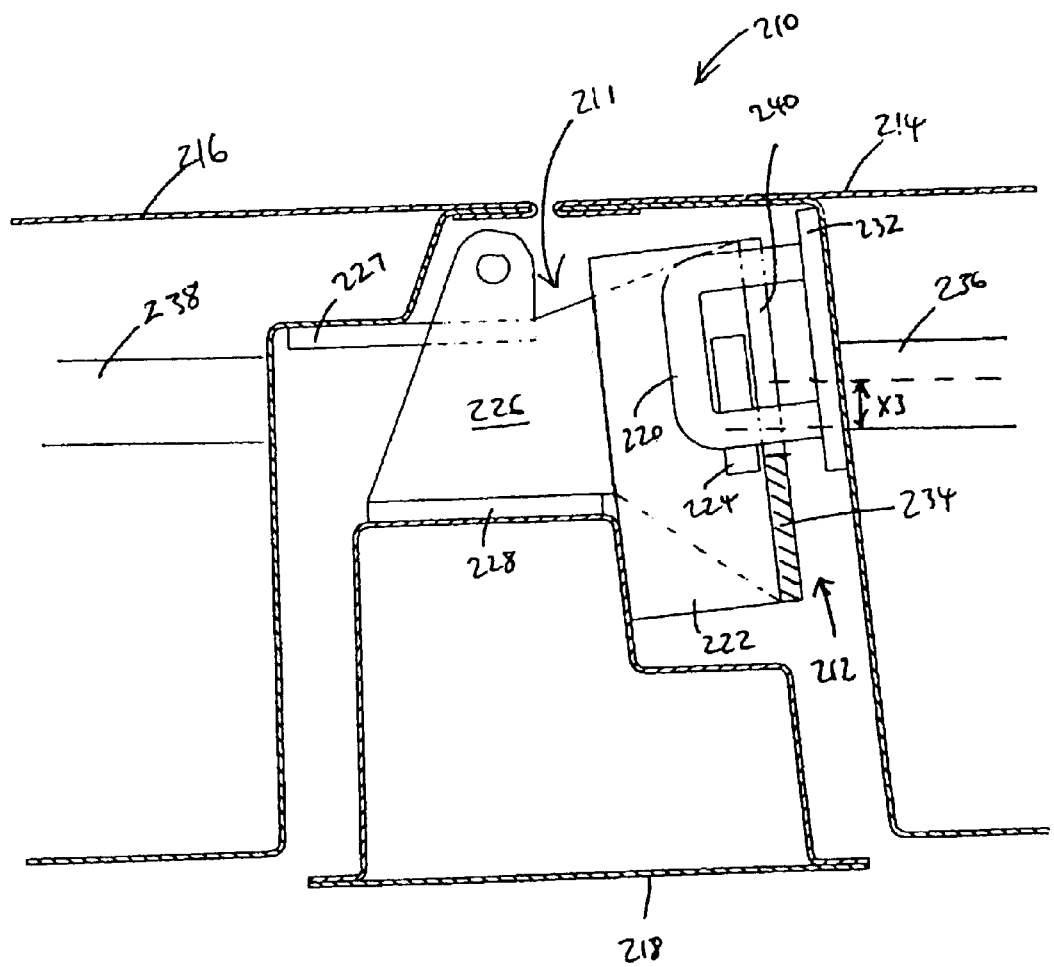
FIG. 3 is a cross-sectional view through a door and pillar arrangement incorporating a hinge and latching arrangement according to a second embodiment of the present invention.

Turning now to FIG. 3 which illustrates a second embodiment of the present invention in which again like numerals have been used for like parts with the addition of the prefix '2'.

It should be apparent that this embodiment has a very similar underlying principle to the embodiment of FIG. 2, except that the relative positions of the striker 220 and latch 222 have been reversed such that the striker is mounted on the front door 214 and the latch 222 is mounted on the hinge 211. Consequently, the profile of the pillar 218 has been locally adjusted to accommodate the latch. Again, it can be seen that the offset X3 between the intrusion bar axis 236 and the point of securement between the striker 220 and latch 222 has been significantly reduced and again in preferred classes of embodiment may be co-axial with the beam 136.

Advantageously, the retention plate 234 of the latch 222 including striker receiving mouth 240 is integrally formed with the mounting member 226 to further enhance the structural integrity of hinge 211, potentially simplifying the manufacturing process and minimizing the part count.

Terms such as "front", "rear", "side", "inboard", "outboard", "fore" and "aft" as used above should be understood in terms of conventional orientations that are used when describing vehicles and parts thereof, but that such orientations should not be construed as limiting.

It should be appreciated that numerous changes may be made within the scope of the invention. For example, known alternative latching and hinge arrangements may be employed, as may alternative door types such as sliding doors, for example.

What is claimed is:

1. A hinge assembly for mounting a vehicle door comprising:
   a mounting member mountable to a support member;
   a hinge member pivotally attached to said mounting member, said hinge member attachable to a rear door; and
   a latch member mounted to said mounting member for releasably securing a front door.

2. The assembly of claim 1, wherein said latch member comprises a striker engageable with a claw disposed within the front door.

3. The assembly of claim 2, wherein said striker comprises a hoop striker.

4. The assembly of claim 2, wherein said mounting member comprises first and second sides, said striker mounted to said first side by at least one fastener, said fastener accessible from said second side of said mounting member for adjusting a position of said striker.

5. The assembly of claim 4, wherein said fastener comprises a threaded fastener.

6. The assembly of claim 5, wherein said striker is adjustable while engaged with the claw of the front door.

7. The assembly of claim 4, wherein said mounting member comprises an opening on said second side for providing access to said fastener.

8. The assembly of claim 1, wherein said latch member comprises a claw corresponding with a striker disposed on the front door.

9. The assembly of claim 8, wherein a housing comprises a space defined between first and second sides of said mounting member said claw mounted within said space.

10. The assembly of claim 9, wherein said housing comprises an opening, and the striker of the front door is movable into said opening to engage said claw mounted within said housing.

11. The assembly of claim 10, wherein the front and rear doors comprise a beam, mounted along a longitudinal axis and said latch member is mounted in substantial alignment with said longitudinal axis.

* * * * *